(No Model.)  O. M. SHANNON.  3 Sheets—Sheet 1.
COMBINED SUPPORT AND KEEPER FOR BICYCLES.
No. 557,900. Patented Apr. 7, 1896.
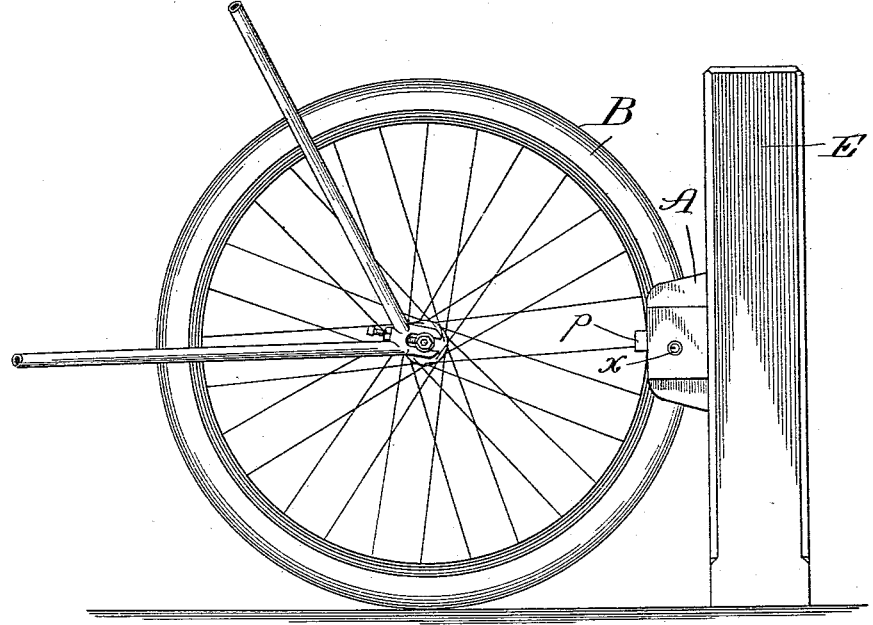
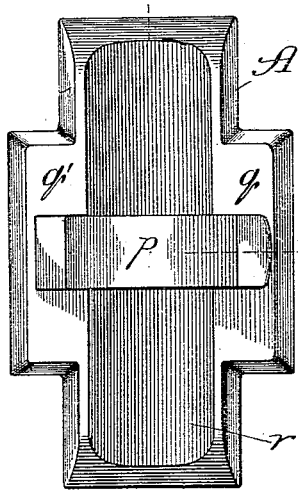
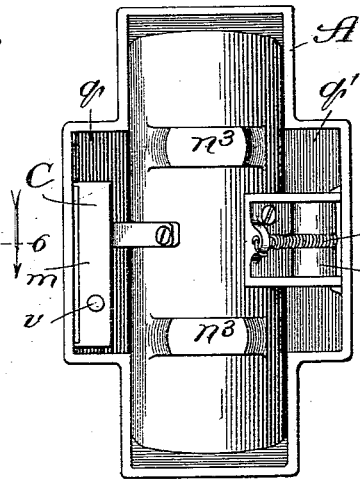
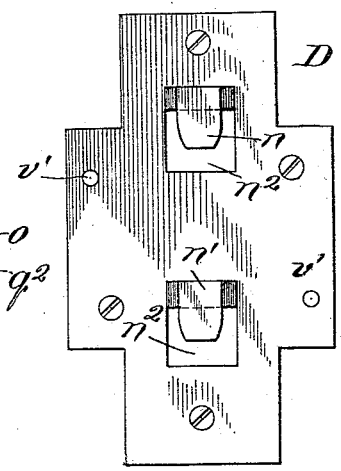
Witnesses:
Inventor:
Oscar M. Shannon,
By Dyrenforth & Dyrenforth,
Att'ys (No Model.) 3 Sheets—Sheet 2.
O. M. SHANNON.
COMBINED SUPPORT AND KEEPER FOR BICYCLES.
No. 557,900. Patented Apr. 7, 1896.
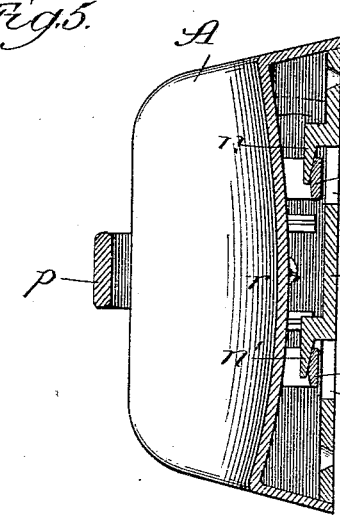
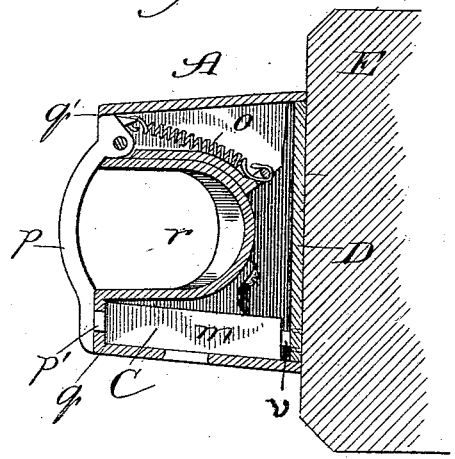
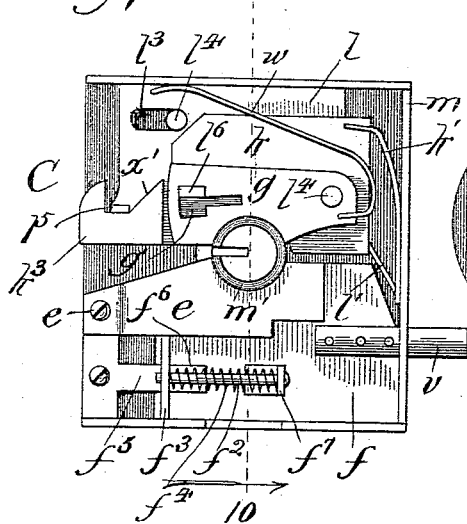
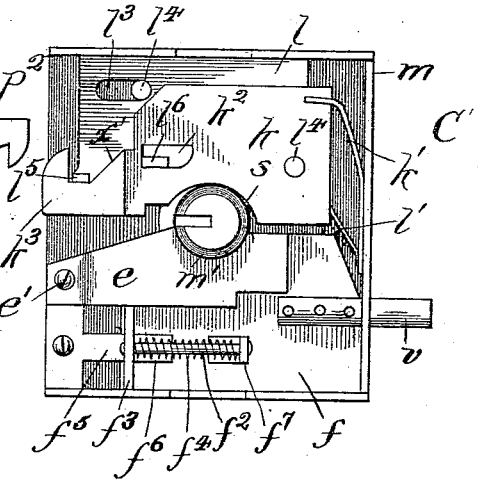
Witnesses:
Inventor:
Oscar M. Shannon,
By Dyrenforth and Dyrenforth
Atty's (No Model.) 3 Sheets—Sheet 3.
O. M. SHANNON.
COMBINED SUPPORT AND KEEPER FOR BICYCLES.
No. 557,900. Patented Apr. 7, 1896.
Fig. 9.
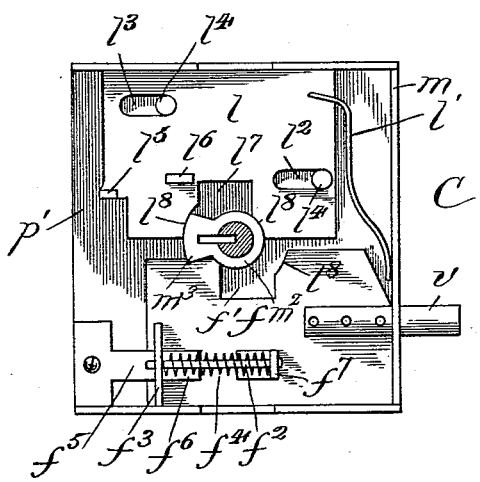
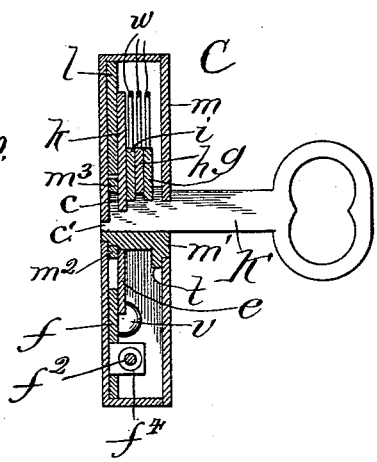
Fig. 10.
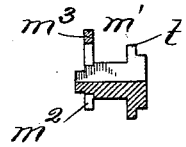
Fig. 11.
Witnesses:
Chas. E. Gaylord,
Lute J. Alter
Inventor:
Oscar M. Shannon,
By Dyrenforth & Dyrenforth,
Attys.

UNITED STATES PATENT OFFICE.

OSCAR M. SHANNON, OF RIVERSIDE, ILLINOIS.

COMBINED SUPPORT AND KEEPER FOR BICYCLES.

SPECIFICATION forming part of Letters Patent No. 557,900, dated April 7, 1896.

Application filed August 26, 1895. Serial No. 560,550. (No model.)

*To all whom it may concern:*

Be it known that I, OSCAR M. SHANNON, a citizen of the United States, residing at Riverside, in the county of Cook and State of Illinois, have invented a new and useful Improvement in a Combined Support and Keeper for Bicycles, of which the following is a specification.

The matter of disposing of bicycles both at home and in offices and other places of storage more or less convenient of access to the owner's occasions them considerable trouble and inconvenience. In the home of the rider a bicycle if propped against a wall—the ordinary manner of disposing of it while out of use—is liable to injure the wall, and the bicycle is liable to become marred by falling down or by being rubbed against. This and other objections attend the common manner of disposing of bicycles while out of use in offices and other storage places.

While various means have been provided for locking and dismantling a bicycle with a view to preventing a purloiner thereof from using it as a means of escape by riding it, the means referred to do not secure the bicycle against being carried off; nor am I aware of any securing means for a bicycle that may not more or less readily be severed from their mooring by a thief bent on stealing the wheel.

The primary object of my invention is to provide means for supporting a bicycle when out of use in upright position, and for effectually holding it at the same time against unauthorized detachment from its keeper.

To this end I provide for supporting the bicycle at one of its wheels in upright position means affording at the same time a keeper or lock so fastened to a stable object—such as a wall, post, or floor—that the bicycle cannot be separated from its keeper nor the latter practically from the object to which it is fastened without first unlocking the keeper to release the bicycle; and for my aforesaid purpose I prefer to provide a lock of peculiar construction.

Referring to the accompanying drawings, Figure 1 shows my improved device, by a view in side elevation, in one of its operative positions—namely, fastened to the side of a post—and engaging a wheel of a bicycle, of which only a broken portion is shown in side elevation. Fig. 2 is a view in front elevation of my improved device enlarged over the scale observed in Fig. 1; Fig. 3, a view in rear elevation of the lock-case; Fig. 4, a view in front elevation of the back for the case, through the medium of which the case is removably fastened to the post or other stable object; Fig. 5, a section taken at the line 5 on Fig. 2 and viewed in the direction of the arrow; Fig. 6, a section taken at the line 6 on Fig. 2 and viewed in the direction of the arrow, but showing the lock in elevation and the case adjusted on its back, fastened in operative position; Fig. 7, a view in rear elevation showing the mechanism of the lock enlarged over the scale observed in Fig. 2; Fig. 8, a similar view of the same, with the tumblers removed; Fig. 9, a similar view of the same with the tumblers, shield-plate, and other details removed; Fig. 10, a section taken at the line 10 on Fig. 7, viewed in the direction of the arrow and showing the key inserted and as turned one-fourth of a revolution toward the right; and Fig. 11, a sectional view of the slotted key-arbor detail.

A is the block or case, formed as a casting of any suitable, strong, and durable material, preferably malleable iron, and having as an essential feature a longitudinal recess $r$, which should be central of the case and of the form, or substantially the form, in cross-section (thus longitudinally curved, as shown,) of that portion of the tire-encircled wheel B of a bicycle which is to be inserted into it and locked. At the opposite sides of the case are shown enlargements affording housings $q$ and $q'$, or chambers, flanking the concavo-convex wall of the recess $r$, for the internal mechanism, such as is hereinafter described, or intended for the same general purpose. In one side of the case, as in the housing $q$, is the lock C, the preferred but not essential construction of which is that hereinafter described, and which engages with one end of a swinging bolt $p$, hinged at the opposite side of the recess $r$ at the housing $q'$, wherein, in a compartment $q^2$ formed within it, is provided a spring $o$ tending to throw out the bolt when unlocked, the bolt in its locked position spanning the recess and being preferably of a curved shape, longitudinally, to conform to the cross-section of the inner circumference of the rim of a wheel B.

D is the back of the case, which should conform to the shape of and fit within the inner edge of the case; and the back carries on its inner face two rectangular lugs $n$ and $n'$, adjacent to openings $n^2$, (see Fig. 4,) through which project sockets $n^3$ on the under convex surface of the wall of the recess $r$ when the case A is applied to the back D, to receive the lugs and thus support the case. The relative arrangement of the lugs $n\ n'$ with the adjacent openings $n^2$ and the sockets $n^3$ is such as to enable the latter to be readily slipped over the lugs with either end of the case uppermost, so that the keyhole $x$ in the case may be either on its right or left side, according to convenience.

A feature of the lock C is an inner reciprocable bolt $v$ to enter an opening $v'$ near either of two corners of the lock D, (depending on which end of the case A is uppermost by its adjustment upon the back,) and until the bolt $v$ is withdrawn from its opening $v'$ the case cannot be moved lengthwise (upward) on the back D to cause the sockets $n^3$ to clear the lugs $n\ n'$, so that the bolt affords a stop against separation of the case from its back. This back is rigidly fastened, by screws or other means, for the use of my improved device, to some staple object, as a post E or the wall of a room or compartment, in either of which locations it occupies a vertical position, or to a floor, in which location it occupies a horizontal position.

The case being formed, as it preferably is, entire or seamless, without parts riveted or otherwise fastened together, and covering the back D at which my improved device is rigidly fastened in place, obviously the device cannot be removed from its support without removing the latter with it (which is a practical impossibility) unless by unlocking the device to withdraw the bolt $v$ from the back, when, by forcing the case longitudinally, the sockets $n^3$ are caused to clear the lugs $n\ n'$ to enable the case to be separated from the back.

To support and lock a bicycle by means of my improved combined support and keeper therefor, the wheel (preferably, but not necessarily, the rear wheel) is inserted into the recess $r$, the bolt $p$ being opened for the purpose, when the bolt is swung across the inner circumference of the wheel and engaged with the lock C. Thus a bicycle may be held in its proper upright position and locked in a suitable and safe manner.

To adapt my improved device the better for its purpose, the lock C may be and preferably is of a special construction, and it should be a snap-lock for engaging the bolt $p$ automatically in inserting its free end into the opening $p'$ of the lock-case and be adapted to permit the bolt $p$ to be opened and withdraw the bolt $v$ by means of a single key inserted into the one keyhole. Accordingly I have devised the lock construction of which the following is a description: The mechanism of the lock C is contained in a case $m$, shown as rectangular in form and having in the center of its opposite sides openings affording bearings for the ends of a rotary slotted key-arbor $m'$, enlarged and circumferentially flanged, as shown at $t$, about its outer end portion and reduced near its opposite end, where it passes through an annular keyguard $m^2$ in the bottom of the case $m$, surrounding the opening therein and having a radial slotted extension $m^3$. In the lockcase, on the bottom or inner surface thereof to one side of the key-guard, is confined a plate $l$ (see Fig. 9) against a spring $l'$ and having longitudinal slots $l^2$ and $l^3$ near opposite corners for limiting the reciprocating motion of the plate by the posts $l^4$, which extend through the slots from the back of the lock-case, and the plate $l$ carries the perpendicular studs $l^5$ and $l^6$, while in its edge adjacent to the key-arbor is provided the rectangular recess $l^7$, widened toward the edge of the plate by forming the concave segmental sections $l^8$, affording guide-bearings for the end of the slotted extension of the keyguard $m^2$, which is on the same plane with the plate. Imposed upon the plate $l$ and pivoted to the rear post $l^4$ is a reciprocable catch-plate $k$, controlled by a spring $k'$ at one end and having near its opposite end a slot $k^2$, through which the stud $l^6$ projects, and from the end of the plate $k$ adjacent to the slot $k^2$ there projects the hook-shaped catch $k^3$ into the opening $p'$ in the lock-case, which the similarly-shaped catch $p^2$ on the free end of the swinging bolt $p$ enters to engage the catch $k^3$, which is beveled, as shown at $x'$, along one edge toward its inner end and bears laterally against the stud $l^5$. Moreover, in the edge of the plate $k$ adjacent to the recess $l^7$ in the plate $l$ is formed a concave recess $s$ to clear the stem of the key-arbor $m'$. On the plate $k$ are imposed one upon the other the tumblers $i$, $h$, and $g$, each pivoted upon the innermost post $l^4$ and controlled by a spring $w$, the tumblers being all of substantially the same construction, with concave recesses in their edges adjacent to the key-arbor for the same purpose as the recess $s$ in the plate $k$, and each tumbler having a T-shaped slot $g'$ near its outer end, through which the stud $l^6$ extends.

The bolt $v$, which projects through an opening in the lock-case at the side or edge thereof opposite that in which the opening $p'$ for the bolt $p$ is provided, is carried by a reciprocable plate $f$, having a recess $f'$ in its edge adjacent to the key-arbor, in shape like the recess $l^7$ in the plate $l$, except that it has only one rear concave segmental guide-edge $l^8$ for the key-guard $m^2$. The plate $f$ carries a bearing $f^7$ for one end of a rod $f^2$, supported at its opposite end in a rigid bearing $f^3$ in the lock-case and surrounded by a spiral spring $f^4$ confined between said bearings to tend to hold the bolt $v$ in its outermost position, and, as shown in Fig. 8, a further guide for the reciprocating plate $f$ is afforded by a tongue $f^5$ in the lock-case projecting into a longitudinal slot $f^6$, extending inward from the adjacent end of the plate $f$. At its inner recessed edge the plate $f$ is overlapped by a guard-plate $e$, rigidly fastened at $e'$ in the lock-case to prevent access, as by a wire, through the key-arbor to the recess $f'$ for the purpose of forcing the plate $f$ in the direction of withdrawing the bolt $v$ to release the case A from its back D, and thereby enable the case to be carried off with the bicycle it is holding.

To open the lock, a key K is inserted into the slotted key-arbor $m$, and to permit the insertion in a manner to render the key operative for unlocking the device the slot in the radial extension of the key-guard $m^2$ and that in the arbor must coincide. Then, on inserting the key, its extreme end $c'$ will find bearing in the hole provided in the inner side of the lock-case, its bit $c$ will be in the slot of the rotary key-guard, and its other bit portions engage the tumblers $i$, $h$, and $g$ by turning the key toward the right, whereby the tumblers are turned against their springs on their common pivot $l^4$ till the stems of their T-shaped slots $g'$ are brought into alinement with the stud $l^6$, when the slotted extension $m^3$ of the key-guard will have entered the recess $l^7$ in the plate $l$ and reached a position of bearing against the inner edge of the recess. By then continuing to turn the key the extension $m^3$, by bearing against the plate $l$, retracts it against its spring $l'$, thereby drawing the stud $l^5$ along the inclined edge $x'$ of the catch $k^3$ on the pivotal plate $k$ and forcing that catch laterally out of engagement with the catch $p^2$ on the bolt $p$, which latter, thereupon, under the recoil of its controlling-spring $o$, is withdrawn or opened to permit the bicycle held by it to be removed. Further turning of the key K eventually brings the slotted extension $m^3$ of the key-guard $m^2$, after it has inoperatively passed the segmental concave section $l^8$, into engagement with the further or outer straight side of the recess $f'$ in the plate $f$, thereby, in continuing to turn the key, forcing that plate against the resistance of the spring $f^4$ and withdrawing the bolt $v$ from its opening $v'$ in the back plate D to permit the case A to be separated therefrom, if desired. Of course when in the rotation of the key-guard $m^2$ its extension $m^3$ clears the plate $l$, the latter, the plate $k$, carrying the catch $k^3$ and the tumblers, are returned by the recoil of their controlling-springs to their normal relative positions, and the same is true of the plate $f$, carrying the bolt $v$, when the key-guard extension clears the slot $f'$.

It is to be understood that while I prefer to equip my device with a lock of the character of that described, involving as its essential principle the double-lock feature controlled by one key for unlocking the case of the device and the connections thereof with the object to which it is secured, that part of my invention relating to the case for holding the bicycle at its wheel and its fastening to a stable object is not limited to having used with it the particular character of lock referred to; nor do I limit my invention in the lock to the particular details thereof shown and described, as they may be variously modified without departing from my invention. Moreover, a most important feature of my invention is the provision for covering with the case the means for fastening the separable back to a stable object. This is of value whatever may be the means employed for fastening the bicycle-wheel in the seat of the keeper device. Hence I do not limit my invention to the adjustable bolt or any particular locking mechanism for use in fastening the wheel to a keeper involving a separable back and a case covering the fastening means for the back.

What I claim as new, and desire to secure by Letters Patent, is—

1. As a new article of manufacture, a combined support and keeper for a bicycle comprising a case provided with a recess affording a seat for a bicycle-wheel, a bolt adjustable to span said recess for locking the wheel therein, a separable back on the case by which to fasten it to a stable object and having the means of fastening it covered by the case, and locking means in the case for the bolt and for separably securing the back on the case, substantially as and for the purpose set forth.

2. As a new article of manufacture, a combined support and keeper for a bicycle comprising a case provided with a seat for a bicycle-wheel, means for fastening the wheel in said seat, and a separable back secured to the case by which to fasten it to a stable object, and having the means of fastening covered by the case, substantially as described.

3. As a new article of manufacture, a combined support and keeper for a bicycle, comprising a case provided with a recess affording a seat for a bicycle-wheel, a lock in the case at one side of the recess, a swinging bolt hinged at one end to the case at the opposite side of said recess and adjustable to span said recess and engage said lock, and a separable back for said case normally locked therein and by which the device is fastened to a stable object, substantially as described.

4. As a new article of manufacture, a combined support and keeper for a bicycle, comprising a case provided with a recess affording a seat for a bicycle-wheel, a lock in the case at one side of the recess provided with a spring-catch and a reciprocable bolt, both operative by a single key for the lock, a swinging bolt hinged at one end to the case at the opposite side of said recess and adjustable to span said recess and engage said catch, and a separable back for said case, by which the device is fastened to a stable object, and secured by said reciprocable bolt, substantially as described.

5. As a new article of manufacture, a combined support and keeper for a bicycle, comprising a case provided with a recess affording a seat for a bicycle-wheel, sockets on the convex wall of the recess, a lock in the case at one side of the recess, provided with a spring-catch and a reciprocable bolt, a swinging bolt hinged at one end to the case at the opposite side of said recess and adjustable to span said recess and engage said catch, a back for the case, provided with lugs for engaging said sockets, and upon which the case is adjustable from either end, the back being secured by said reciprocable bolt and affording the means for fastening the device to a stable object, substantially as described.

6. As a new article of manufacture, a combined support and keeper for a bicycle, comprising a case A provided with a recess $r$ having sockets $n^3$ on the convex side of its wall, a lock in the case at one side of the recess, provided with a spring-catch and a reciprocable bolt $v$, a spring-controlled swinging bolt $p$ hinged at one side to the case at the opposite side of said recess and adjustable to span said recess and engage said catch, a back for the case provided with openings $n^2$ and $v'$ and with lugs $n$ and $n'$ for engaging said sockets, the back being secured at one of its openings $v'$ by said reciprocable bolt and affording the means for fastening the device to a stable object, substantially as described.

7. As a new article of manufacture, a combined support and keeper for a bicycle, comprising a case provided with a recess affording a seat for a bicycle-wheel and provided with a separable back by which the device is secured to a stable object, a swinging bolt hinged at one end to the case at one side of the recess, and a lock in the case at the opposite side of the recess, comprising a case C containing a spring-controlled reciprocable plate $l$ provided with a recess $l^7$ and carrying studs $l^5$ and $l^6$, a spring-controlled plate $k$ pivoted on said plate $l$ and having a slot $k^2$ through which the stud $l^6$ projects and a catch $k^3$ to be engaged by the catch on the free end of said engaging bolt and provided with a beveled edge $x'$, spring-controlled tumblers provided on the plate $k$ and having slots $g'$ through which said stud $l^6$ extends, a spring-controlled reciprocable plate $f$ having a recess $f'$ and carrying a bolt $v$ to engage said back, and a key-guard $m^2$ having a slotted extension $m^3$ and a slotted key-arbor $m'$ between the plates $l$ and $f$, substantially as and for the purpose set forth.

8. As a new article of manufacture, a combined support and keeper for a bicycle, comprising a case provided with a recess affording a seat for a bicycle-wheel and provided with a separable back by which the device is secured to a stable object, a swinging bolt hinged at one end to the case at one side of the recess and a lock in the case at the opposite side of the recess, comprising a case C containing a spring-controlled reciprocable plate $l$ provided with a recess $l^7$ and carrying studs $l^5$ and $l^6$, a spring-controlled plate $k$ pivoted on said plate $l$ and having a slot $k^2$ through which the stud $l^6$ projects and a catch $k^3$ to be engaged by the catch on the free end of said swinging bolt and provided with a beveled edge $x'$, spring-controlled tumblers provided on the plate $k$ and having slots $g'$ through which said stud $l^6$ extends, a spring-controlled reciprocable plate $f$ having a recess $f'$ and carrying a bolt $v$ to engage said back, a guard-plate $e$ for the plate $f$, and a key-guard $m^2$ having a slotted extension $m^3$ and a slotted key-arbor $m^4$ between the plates $l$ and $f$, substantially as and for the purpose set forth.

OSCAR M. SHANNON.

In presence of—
J. N. HANSON,
J. H. LEE.